United States Patent
Luo et al.

(10) Patent No.: US 8,160,832 B2
(45) Date of Patent: Apr. 17, 2012

(54) APPARATUS AND METHOD FOR IDENTIFYING A DEFECT AND/OR OPERATING CHARACTERISTIC OF A SYSTEM

(75) Inventors: Huageng Luo, Clifton Park, NY (US); Michael Richard Durling, Saratoga Springs, NY (US); Andrew Lawrence Ruggiero, Lee's Summit, MO (US); Zongqi Sun, Albany, NY (US); Harry Kirk Mathews, Jr., Clifton Park, NY (US); Robert William Tait, Brighton, MI (US); Benjamin Paul Church, Blue Springs, MO (US); Thomas Anthony Tougas, Lee's Summit, MO (US)

(73) Assignee: Progress Rail Services Corp, Albertville, AL (US)

( * ) Notice: Subject to any disclaimer, the term of this patent is extended or adjusted under 35 U.S.C. 154(b) by 0 days.

(21) Appl. No.: 12/708,921

(22) Filed: Feb. 19, 2010

(65) Prior Publication Data

US 2010/0141441 A1 Jun. 10, 2010

Related U.S. Application Data

(62) Division of application No. 11/758,996, filed on Jun. 6, 2007, now Pat. No. 7,693,673.

(51) Int. Cl.
*G01K 15/00* (2006.01)
*G01M 17/10* (2006.01)

(52) U.S. Cl. ....................... 702/99; 246/169 S

(58) Field of Classification Search ............. 702/99, 702/33–36, 39, 41–43, 56, 66, 70–73, 75–76, 702/81, 84–85, 101, 103–106, 127, 130–132, 702/136, 142–143, 145–148, 173–176, 182–185; 104/18, 41, 43, 46; 105/1.4, 26.05, 53–54, 105/96, 154–155, 218.1; 246/2 F, 169 A, 246/169 R, 169 S; 701/19–20; 374/4, 100, 374/117, 119, 121, 124, 132, 137, 141–142, 374/159, 186–187

See application file for complete search history.

(56) References Cited

U.S. PATENT DOCUMENTS

| 7,693,673 | B2* | 4/2010 | Luo et al. | 702/99 |
| 7,705,743 | B2* | 4/2010 | Barone et al. | 340/682 |
| 2008/0234964 | A1* | 9/2008 | Miyasaka et al. | 702/113 |

FOREIGN PATENT DOCUMENTS

FR 2846089 A1 * 4/2004

OTHER PUBLICATIONS

FR 2846089 A1 Description English Translation Version, 4 pp.*
FR 2846089 A1 Claims English Translation Version, 1 pp.*
Belotti et al., Wheel-Flat Diagnostic Tool via Wavelet Transform, 2006, Mechanical Systems and Signal Processing 20, pp. 1953-1966.*
Anderson et al., Acoustic Detection of Roller Bearing Defects: Phase II, Field Test, Aug. 2003, Final Report, U.S. Department Federal Railroad Administration, 60 pp.*

(Continued)

*Primary Examiner* — Michael Nghiem
*Assistant Examiner* — Toan M Le

(57) ABSTRACT

An apparatus and methods for identifying a defect and/or an operating characteristic of a system being monitored (and/or one or more of the system's components) are described. In an embodiment, orthogonally related data monitored by two or more detectors may be fused to determine whether a component of a system is defective and/or malfunctioning. Additionally or alternatively, data from a first detector may be determined to be accurate using non-orthogonally related data outputted by a second detector. Both types of determinations may be made with minimal or no false indications, which lowers the cost of operating the system being monitored. Embodiments of the invention may also be configured to forecast and/or prevent accidents and/or damage to the system being monitored by predicting whether a defect and/or a malfunction will occur.

8 Claims, 8 Drawing Sheets

OTHER PUBLICATIONS

FR 2846089 A1 Description English Translation Version, Apr. 2004, 4 pp.*

FR 2846089 A1 Claims English Translation Version, Apr. 2004, 1 pp.*

* cited by examiner

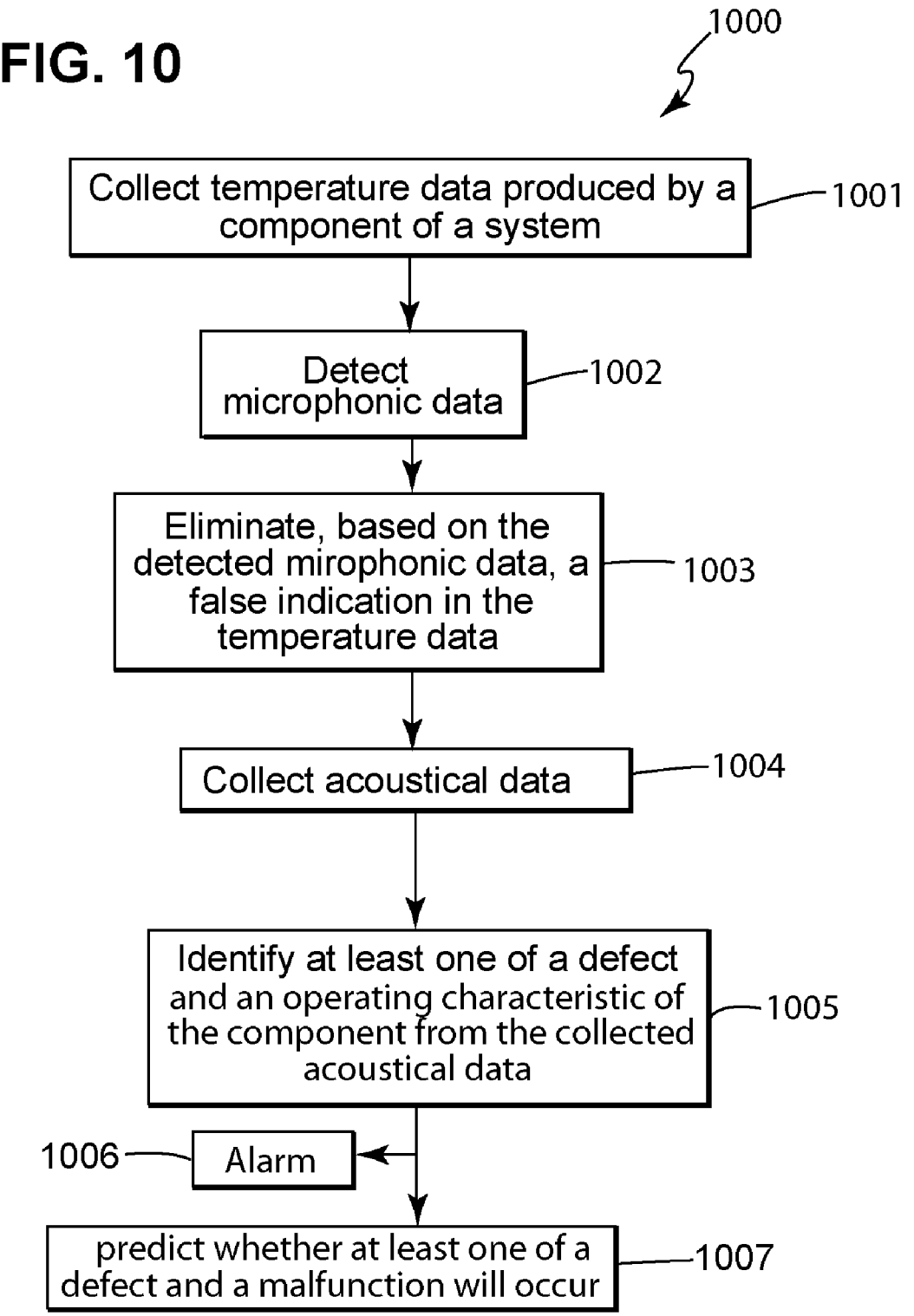

APPARATUS AND METHOD FOR IDENTIFYING A DEFECT AND/OR OPERATING CHARACTERISTIC OF A SYSTEM

CROSS-REFERENCE TO RELATED APPLICATIONS

The present application is a divisional application under 35 U.S.C. §120 of prior-filed U.S. application Ser. No. 11/758, 996 filed Jun. 6, 2007, now U.S. Pat. No. 7,693,673, which is hereby incorporated by reference in its entirety.

BACKGROUND

1. Field of the Invention

The field of the invention generally relates to a system and method for inspecting machinery, and more particularly, to a system and method for determining whether a mechanical or an electromechanical system exhibits a defect and/or an operating characteristic during use.

2. Description of Related Art

Railroad rolling stock (locomotives, railcars, and other examples of wheeled transportation equipment for railways), gas turbines, and other types of machinery are examples of systems—assemblages of parts forming a complex or unitary whole. A system typically functions properly when its parts achieve optimal operating characteristics during use. In a mechanical or electromechanical system, one exemplary "operating characteristic" is the true temperature of a system component. If a system component overheats during use beyond a certain point, the component will break down, sometimes catastrophically. One example of this is wheel bearings for railcars, which will overheat and/or break down if the railcar wheel and/or components of a wheel bearing are defective and/or malfunction during use.

FIG. 1 illustrates an example of a conventional railcar truck 1 (sometimes referred to as a "bogie" in European parlance) that includes a wheel 4 rotatably attached to an axle 2. A wheel bearing assembly 8 is pressed onto each end of the axle 2 near the wheel plate area—typically a side surface of the wheel 4 between about the wheel's center and its rim 3. The railcar truck sideframe 6 includes a u-shaped pedestal jaw 5 that fits over a wheel bearing adapter 7, which bears down upon the wheel bearing assembly 8. Each wheel bearing assembly 8 functions to support and transfer the weight of the railroad rolling stock onto the axle 2 and through the wheel 4 to the railroad track 30. When components of each wheel bearing assembly 8 (e.g., bearings, seals, and lubricant) are in peak condition, each wheel 4 rotates with minimal friction. Otherwise, increased friction from a defective wheel 4 and/or a defective component of the wheel bearing assembly 8 can cause the wheel bearing assembly 8 to overheat and/or to break down. Various types of wheel bearing assemblies have been developed, but at present, roller bearing assemblies are common.

FIG. 2 is an end view of the conventional railcar truck 1 of FIG. 1 that further illustrates placement of the wheel bearing assembly 8 and illustrates a region (represented by vertical axis 9) of the wheel bearing assembly 8 scanned by a trackside heat sensor (not shown) (commonly referred to as a "hot box detector" within the rail industry) as the railcar truck 1 rolls past. An example of a hot box detector is shown in FIG. 3 as detector 10.

FIG. 3 is a perspective view of a conventional wayside inspection station ("WIS") 300 configured to inspect railroad rolling stock on the fly for one or more abnormal operating characteristics, examples of which include overheated wheel bearing assemblies, dragging equipment, overheated railcar truck wheels, and the like. The WIS 300 consists of several computer-controlled detectors 10, 72, 302 that are networked with one or more local and/or remote computers (not shown). Positioned on the ground adjacent a rail of the railroad track 30, the detector 10 is a hot box detector configured to measure an operational temperature of a wheel bearing assembly of a passing railcar truck. Positioned above the ground and a predetermined distance away from the railroad track 30, the detector 72 is a hot wheel detector configured to measure an operational temperature of the railcar truck's wheel(s). Positioned on the ground between the rails of the railroad track 30, the detector 302 is a dragging equipment detector configured to detect whether the railcar truck is dragging anything. Positioned across the railroad track 30 from the hot wheel detector 72, a sight board 301 functions to align the hot wheel detector 72 and to provide a reference temperature that serves as a base value to produce semi-absolute wheel plate temperature readings.

Typically, both the hot box detector 10 and the hot wheel detector 72 are each configured to convert sensed infrared heat energy (produced by a component of a railcar truck) to an electrical signal that is proportional to the amount of heat outputted (from a wheel bearing assembly and wheel, respectively) relative to ambient temperature. The dragging equipment detector 302 is configured to convert impact energy imparted to the detector's strike plate to an electrical signal. The electrical signals (if any) outputted from each of the hot box detector 10, the hot wheel detector 72, and the dragging equipment detector 302 in response to passing railroad rolling stock are then routed to a computer processor (typically located in a trackside bungalow (not shown)) for analysis and processing.

This is further illustrated in FIG. 4, which is a diagram illustrating a conventional configuration of the WIS 300 of FIG. 3. The trackside bungalow 404 containing electrical and electronic equipment 407, 409, 410 is typically positioned near the railroad track 30. The equipment housed by the trackside bungalow 404 typically consists of a computer 410 (sometimes called a "digital processing unit"), a modem 409, and a transceiver 407, each of which may be interconnected by a wired communications channel 405. The computer 410 and the transceiver 407 are typically coupled with an external computer network (not shown) via a wireless communications channel 406 and/or an antenna 408. Additionally, the computer 410 is typically linked with one or more detectors 10, 72, 302, 402 via a wired or wireless communications channel 403 over which signals flow to and from the detectors 10, 72, 302, 402. The detectors 10, 72, and 302 were previously described above. Additionally, detector 402 is a transducer mounted to a rail of the railroad track 30 and configured to alert the WIS 300 of approaching railroad rolling stock.

It has been determined that infrared sensors (such as those typically used in hot box detectors and in hot wheel detectors) typically have a high false indication rate, since they can be affected by sun shot, and microphonics. "Sun shot" occurs when radiation from the sun reflects or directly passes into the infrared sensor and causes a flawed temperature reading. "Microphonics" describes the phenomenon where components in electronic devices transform mechanical vibrations into an undesired electrical signal (noise). As used herein, the term "false indication rate" may include two types of situations. In the first situation, a false alarm is incorrectly generated. In the second situation, a false normal reading is generated. An example of a false normal reading would include indicating that a bearing temperature was within predetermined operating limits, when in fact the bearing temperature exceeded those limits.

Studies have indicated that railcar roller bearings typically operate at a temperature that is about 40° F. (4.4° C.) above ambient in winter and at a temperature that is about 60° F. (15.6° C.) above ambient in summer. In absolute terms, the absolute operating temperatures of railcar roller bearings in hot weather may range from about 120° F. (48.9° C.) to about 160° F. (71.1° C.). Due to increased loads and different design, locomotive roller bearings typically operate about 20° F. (6.7° C.) hotter than railcar roller bearings. These studies have also shown that the operational life of railcar roller bearings decreases significantly if the roller bearings experience operational temperatures in excess of about 160° F. (71.1° C.) for long periods of time. If operating temperatures at or exceeding about 200° F. (93.3° C.) are reached, the roller bearing lubricant can oxidize and/or the bearing assembly seals can degrade. Similarly, if railcar roller bearings are continuously operated at temperatures at or below about 24° F. (−4.4° C.) the roller bearing lubricant may congeal or break down, either of which can cause the roller bearings to overheat.

In general, some governmental studies have indicated that an array of microphones can be used to identify one or more defects in railcar wheel bearing assemblies and/or wheels. These studies, however, left many long-felt needs and problems unresolved. For example, one study concluded that only about 40% of defective bearings were detected on an average train pass, and that this detection level had a 5% false indication rate. Additionally, it was determined that extraneous noise (air hose leaks, high winds, ground borne vibrations, urban sounds, etc.) and noise caused by wheel impacts with the rail(s) of the railroad track could mask the roller bearings' acoustical signatures. An array of microphones was used because conventional acoustical detection techniques would not identify all defect types if only a single microphone was used, particularly types of defects that generate low-frequency acoustic outputs. Moreover, these studies presented no solutions to the long-standing need to reduce the false indication rate.

Within the engineering/manufacturing field, multi-sensor data fusion has been contemplated to increase the accuracy with which a particularly quantity (an example of which is imbalance diagnosis of rotating machinery) can be measured. Several approaches have been proposed. Sensor-level data fusion combines data from like sensors directly and thereafter performs feature extraction and fault declaration from the fused data. Feature-level data fusion uses multiple sensors to collect a particular kind of signal. Feature extraction is then performed on the signal to obtain feature vectors, which are then fused. A fault declaration is made based on the fused feature vectors. Declaration-level data fusion requires each detector to independently produce an estimate of fault declaration. Subsequently, these estimates may be combined (using Bayesian inference methods, voting methods, and other ad hoc methods). It has also been proposed to apply feature-level data fusion to disparate data (such as displacement, acceleration, and acoustics) to capture all embedded characteristics of machine defects and enhance correctness of recognition.

Accordingly, a need exists for an inspection apparatus and method configured to reduce a false indication rate, while correctly identifying a defect or an operating characteristic in a mechanical or an electromechanical system.

SUMMARY OF THE INVENTION

This disclosure describes embodiments of an inspection apparatus and a method configured to accurately detect a defect and/or an operating characteristic in an operating mechanical or electro-mechanical system with minimal or no false indications.

Non-limiting examples of advantages afforded by embodiments of the invention include: reduction in the rate of false indications, ability to forecast potential defects and/or operating characteristics before they occur and/or cause damage, as well as an ability to capture and analyze low-frequency acoustical signatures using a single microphone instead of an array of microphones. Other exemplary advantages include improving an accuracy at which defects are detected and operating characteristics are identified.

In an embodiment of the invention, two or more orthogonally related sensors provide different types of orthogonally related data that when processed by appropriately configured computer hardware and/or computer software and/or fused together can significantly reduce a rate of false indication while maintaining and/or improving a rate of true detection. The phrase "Orthogonally related" is used to describe data, a detector, or a sensor that may be used to provide new information about system defects and/or operating characteristics independently of other data, detectors, and/or sensors. For example, in one embodiment, a temperature detector may be configured to measure and output the true temperature of a wheel bearing, and an acoustical detector may be configured to collect acoustical data that can be used to identify a defect in the wheel bearing. In such an embodiment, the temperature data collected by the temperature detector and acoustical data collected by an acoustical detector are orthogonally related.

In an embodiment of the invention, two or more non-orthogonally related sensors provide different types of non-orthogonal data that when used for validation can significantly reduce a rate of false indication while maintaining and/or improving a rate of true detection. The phrase "Non-orthogonally related" is used herein to describe data, a detector, or a sensor that may be used, not to identify a system defect or operating characteristic, but to validate other data obtained by one or more other detectors and/or sensors. For example, in one embodiment, a temperature detector may be configured to output temperature data indicative of a system defect or operating characteristic. In such an embodiment, an accelerometer may be coupled with the temperature detector and configured to identify vibrations that would cause microphonics. The temperature detector and accelerometer are non-orthogonally related to each other because the data outputted by the temperature detector can be used to identify or predict a system defect or operating characteristic, whereas the data outputted from the accelerometer can be used only to prevent the temperature detector from outputting data or to filter microphonic data from the data outputted by the temperature detector.

As used herein the term "detector" refers to an apparatus comprising and/or coupled with one or more sensors.

Embodiments of the invention can be used in the railroad industry and may be configured to inspect one or more components of locomotives, railroad rolling stock, and other railroad systems. Embodiments of the invention can also be used in other fields or industries to determine an operating characteristic of non-railroad systems. Examples of a "non-railroad system" may include but are not limited to turbines (gas, steam, water, wind), engines, transmissions, manufacturing machines, and the like.

Other features and advantages of embodiments of the invention will become apparent by reference to the following description taken in connection with the accompanying drawings.

BRIEF DESCRIPTION OF THE DRAWINGS

For a more complete understanding of the embodiments of the invention, and the advantages thereof, reference is now made to the following descriptions taken in conjunction with the accompanying drawings, in which:

FIG. 10 is a flowchart of a method that is another embodiment of the method of FIG. 9.

Throughout the several views, like reference characters designate identical or corresponding components and units.

DETAILED DESCRIPTION

A detailed description of one or more embodiments of the invention is now provided with reference to the accompanying drawings labeled as FIGS. 5, 6, 7, and 8. Unless otherwise expressly noted, use of "a" and "an" to describe and/or recite components of embodiments of the invention means "one or more."

Figure 1:
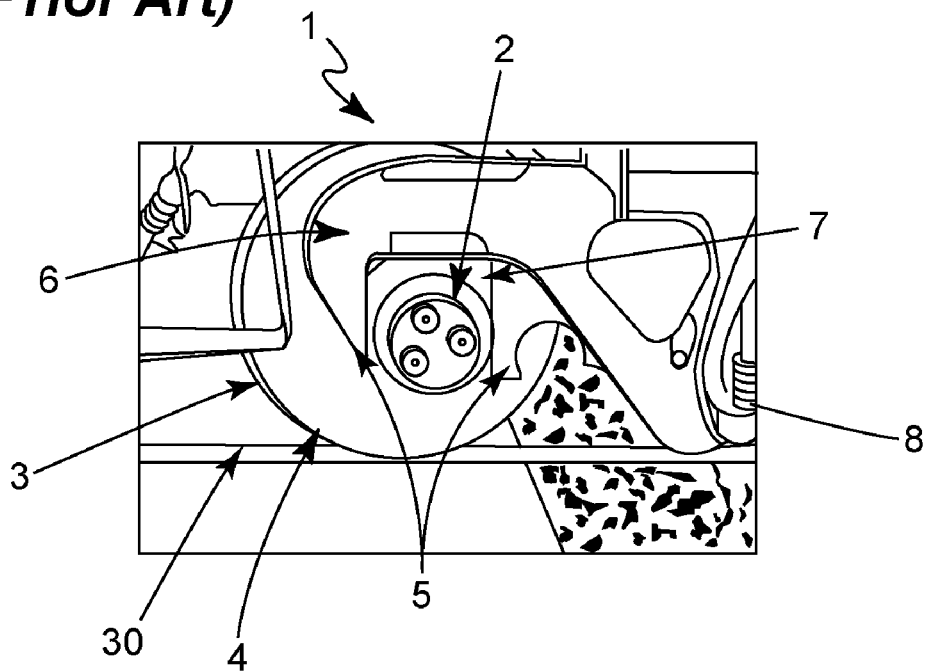
FIG. 1 is a side view of a conventional railcar truck illustrating components thereof.
Figure 2:
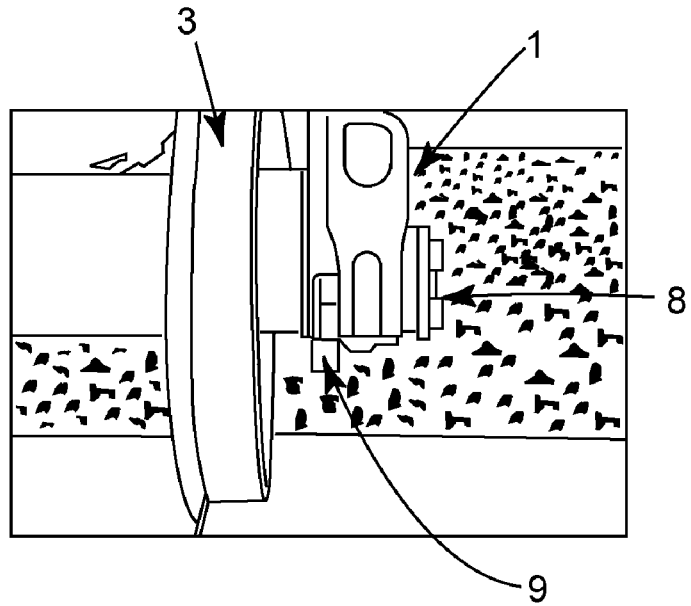
FIG. 2 is an end view of the conventional railcar truck of FIG. 1.
Figure 3:
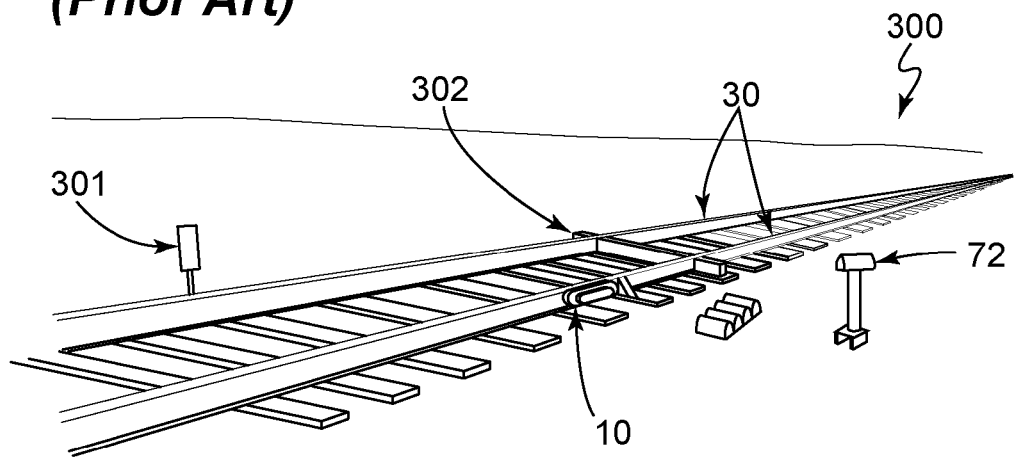
FIG. 3 is a perspective view of a conventional railroad wayside inspection station.
Figure 4:
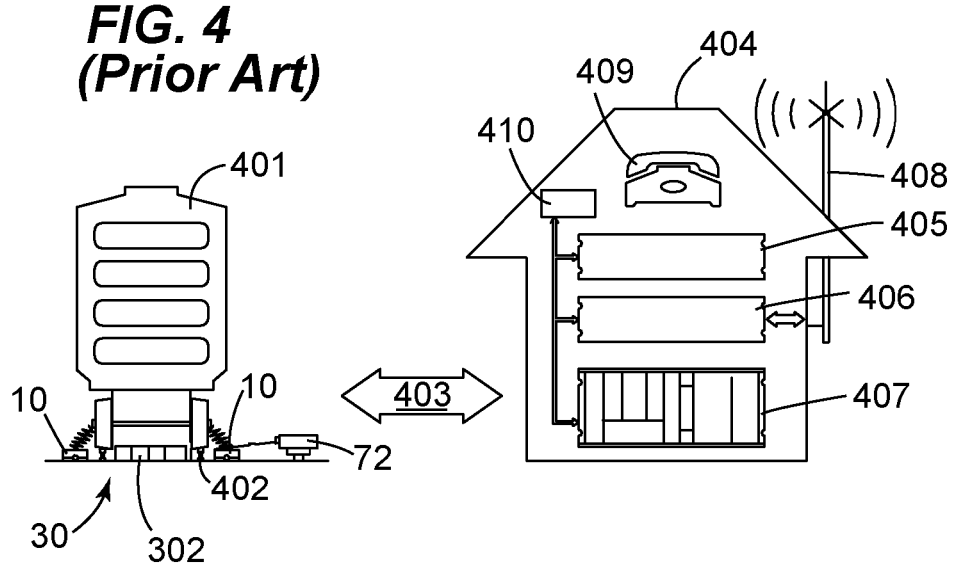
FIG. 4 is a network diagram illustrating information flow within the conventional railroad wayside inspection station of FIG. 3.
Figure 5:
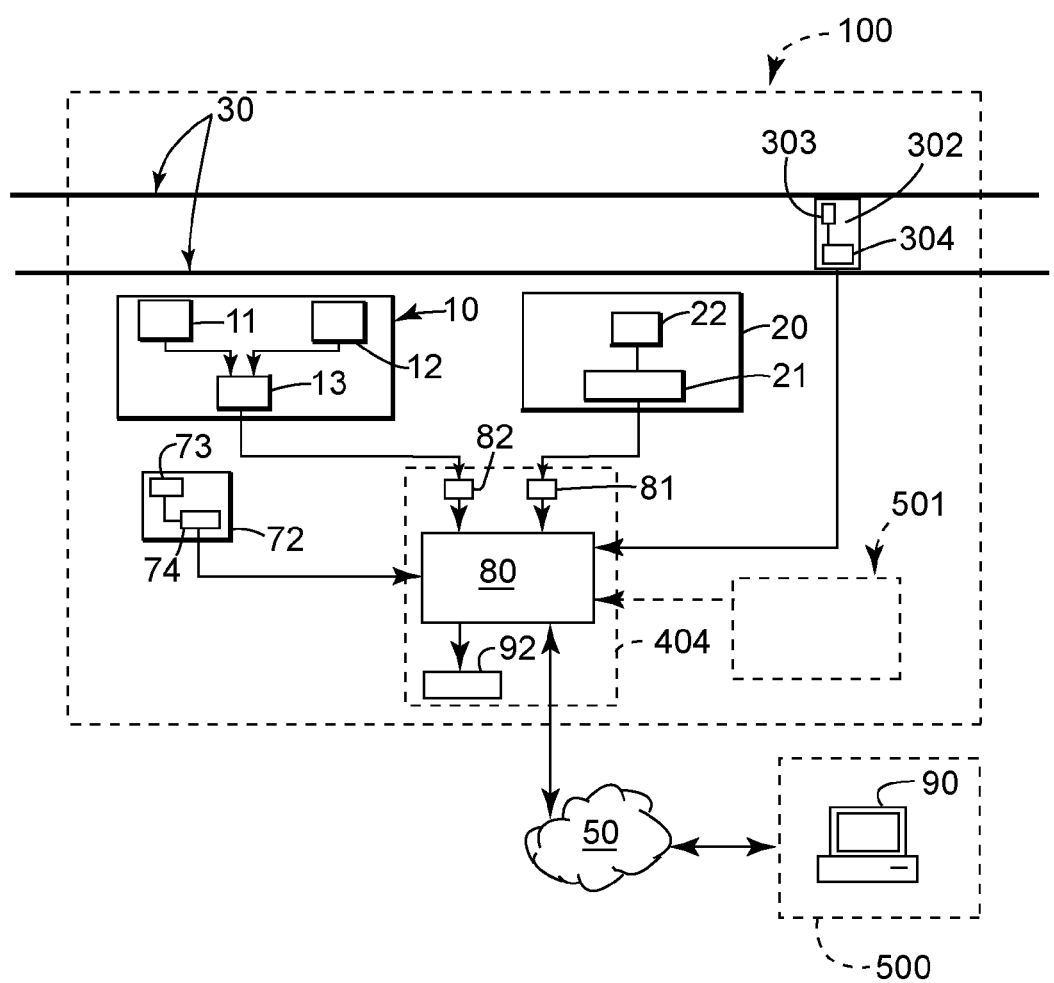
FIG. 5 is a diagram of an embodiment of an improved wayside inspection station that is configured to reduce a rate of false indication.

FIG. 5 is a diagram (not to scale) of an embodiment of an inspection system 100 that may be (or may form part of) a new railroad wayside inspection station. The inspection system 100 may include: detectors 10, 20, 72, 302, and 501; signal conditioners 81, 82; a computer processor 80; a trackside bungalow 404 (optional); and a computer-readable storage medium 92. The inspection system 100 may additionally include (or be linked with) a remote computer processor 90 located at a separate location 500. The computer processors 80 and 90 may be configured to transfer data to and from each other over a local or wide-area network 50 using software, hardware, methods, and communications protocols known in the information technology field. Embodiments of these components of the inspection system 100 are further explained below.

The first detector 10 may be configured to detect a first operating characteristic of a mechanical or an electromechanical system. The second detector 20 may be configured to detect a second operating characteristic of the mechanical or electromechanical system. The third detector 72 may be configured to detect a third operating characteristic of the mechanical or electromechanical system. The fourth detector 302 may be configured to detect a fourth operating characteristic of the mechanical or electromechanical system. The $n^{th}$ detector 501 may be configured to detect an $n^{th}$ operating characteristic of the mechanical or electromechanical system.

Each of the first, second, third, fourth, and $n^{th}$ operating characteristics may be orthogonally-related. For example, in one embodiment, the first operating characteristic may be a true operating temperature of a wheel bearing assembly or a temperature of the wheel bearing assembly relative to local ambient temperature. The second operating characteristic may be an acoustical signature emitted by the wheel bearing assembly. The third operating characteristic may be a true operating temperature of a wheel of a railcar truck or a temperature of the wheel relative to the local ambient temperature. The fourth operating characteristic may be an indication of whether something attached to a train is dragging along the railroad track 30. The $n^{th}$ operating characteristic may be one of: microphonics produced by vibrations in the ambient surroundings and/or of a train as it moves along the railroad track 30; wheel diameter; size/type of wheel bearing assembly; train speed; and sun shot or sky shot data that overlaps portions of temperature data.

Thus, in one embodiment, the first detector 10 may be a hot box detector positioned on the ground adjacent the railroad track 30. The first detector 10 may be a temperature detector (also called a hot box detector) equipped with infrared sensors 11, 12 and configured to detect a temperature of a wheel bearing assembly (or a temperature of a wheel bearing assembly relative to ambient temperature) as a railcar truck passes through a sensing zone of the detector 10. The first detector 10 may optionally include a computer processor 13 (and/or appropriately configured hardware), which is operatively coupled with the infrared sensors 11 and 12 and configured to store, analyze, fuse, and/or transmit data collected by one or both of the infrared sensors 11, 12. Raw or processed data output from the first detector 10 may be conditioned by a signal conditioner 82 and/or processed by an analog-to-digital converter (indicated in FIG. 6 as reference numeral 621) or other device before being received by the computer 80 and/or stored in the computer-readable medium 92. Although not shown, an accelerometer may be coupled with a housing of the first detector 10. The accelerometer may be configured to detect vibrations that would cause the first detector 10 to experience microphonics. Data outputted from the accelerometer may be used either to discard data outputted by the first detector 10 during times when the temperature detector vibrates or to filter microphonic data from temperature data outputted from the temperature detector 10. Data from the accelerometer that is coupled with the first (temperature) detector 10 is not used to eliminate microphonics (if any) that may occur in the second (acoustical) detector 20.

The second detector 20 may be an acoustical detector positioned above the ground and located at a predetermined distance away from both the railroad track 30 and the first (temperature) detector 10. In an embodiment, the second detector 20 may be an acoustical detector that is orthogonally related to the first (temperature) detector 10. The second detector 20 may be equipped with one or more microphones 22. The second detector (and/or the one or more microphones 22) may be insulated from external vibrations. In an embodiment, the acoustical data outputted from the second detector 20 may be processed and/or analyzed by a computer to identify one or more defects in the wheel bearing assembly. In one embodiment, the second detector 20 may optionally include a computer processor 21 (and/or appropriately configured hardware), which is operatively coupled with the microphone 22 and configured to store, analyze, fuse, and/or transmit data collected by the microphone 22. Data output from the second detector 20 may be conditioned by a signal conditioner 81 and/or processed by an analog-to-digital converter (indicated in FIG. 6 as reference numeral 621) or other device before being received by the computer 80 and/or stored in the computer-readable medium 92.

Use of a single microphone 22 in an embodiment of an inspection system 100 has advantages. For example, instead of using a microphone array to detect acoustical signatures, particularly low frequency acoustical signatures, an embodiment of the invention may accomplish the same using only a single microphone and an instant frequency analysis method (further described below). Additionally, in an embodiment, acoustical data about a wheel bearing assembly obtained from a microphone 22 positioned at a first geographical location can be compared with other acoustical data about the same wheel bearing assembly that is obtained from another microphone 22 positioned at a second (different) geographical location. In this manner, an actual defect and/or an operating characteristic can be identified. Alternatively, in this manner, one or more trends can be identified that may indicate a future occurrence of a break down.

In an embodiment, the microphone 22 may be configured to gather a full frequency range of acoustical signatures. A full frequency range may include low, mid, and high frequencies. In an embodiment, low frequency acoustical signatures, mid frequency acoustical signatures, and/or high frequency acoustical signatures can be used to identify one or more particular defects (and/or operating characteristics) in a mechanical or an electromechanical system. In particular, these different types of acoustical frequencies can be used to identify the presence or absence one or more defects in railroad wheel bearing assemblies, as well as the type(s) of the defect(s) detected. Illustratively, low frequency acoustical signatures may range from about several Hz to about several hundreds of Hz depending on the operational speed of the passing railcar. Mid frequency acoustical signatures may range from about several hundreds of Hz to about several thousands of Hz. High frequency acoustical signatures may range higher than about several thousands of Hz.

Any type of microphone 22 may be used, provided it has a suitable range of frequencies within the full range of frequencies mentioned above. To reduce and/or prevent unwanted signal distortion and/or signal gain from ambient or train-induced winds, the microphone 22 (or each microphone 22 if multiple microphones are used) may be housed within an enclosure (sometimes referred to as a "horn"). Additionally, the microphone 22 may be covered with a wind shield. To ensure accurate recording of acoustical signatures, the microphone(s) 22 may be placed at a predetermined distance from a sidewall of a rail of the railroad track 30 and/or at a predetermined height above the ground.

It is also contemplated that multiple microphones 22 can be used with an embodiment of the instant frequency analysis method described herein. Such multiple microphones 22 can be aggregated within a wayside inspection station and/or singly spread out along a predetermined length of the railroad track 30. In either case, the multiple microphones 22 may be located parallel or substantially parallel a rail of the railroad track 30 and arranged at predetermined same or varying heights. The height of each of the multiple microphones 22 above the ground may correspond to a height at which a particular type of system component (such as a wheel bearing assembly) is positioned above the ground. Such an arrangement permits a train having various wheel bearing assemblies spaced at varying heights above the ground to be accurately acoustically scanned in a single pass.

Although not shown in FIG. 5, the inspection system 100 may further include a wheel size detector and/or a wheel bearing type detector, which may be configured to activate a microphone (22) that has the same (or substantially the same) height as the detected type of wheel bearing assembly.

Referring still to FIG. 5, the third detector 72 may be a hot wheel detector positioned next to a rail of the railroad track, equipped with a pyroelectric heat sensor 73 and configured to detect a temperature of a railcar truck wheel (or a temperature of a railcar truck wheel relative to ambient temperature) as a railcar truck passes through a sensing zone of the detector 72. The term "pyroelectric," and other sensor-specific terms are defined below. The third detector 72 may optionally include a computer processor 74 (or appropriately configured hardware), which is operatively coupled with the pyroelectric heat sensor 73 and configured to store, analyze, fuse, and/or transmit data collected by the pyroelectric heat sensor 73. Raw or processed data output from the third detector 72 may be optionally conditioned by a signal conditioner and/or processed by an analog-to-digital converter or other device before being received by the computer 80 and/or stored in the computer-readable medium 92.

The fourth detector 302 may be a dragging equipment detector positioned on the ground between the rails of the railroad track 30, equipped with at least one accelerometer 303, and configured to determine whether a train is dragging anything along the railroad track 30. The fourth detector 302 may optionally include a computer processor 304 (or appropriately configured hardware), which is operatively coupled with the accelerometer 303 and configured to store, analyze, fuse, and/or transmit data collected by the accelerometer 303. Raw or processed data output from the fourth detector 302 may be optionally conditioned by a signal conditioner and/or processed by an analog-to-digital converter or other device before being received by the computer 80 and/or stored in the computer-readable medium 92.

The $n^{th}$ (optional) detector(s) 501 may be any other type of detector suitable for gathering data about a predetermined operating characteristic of a mechanical or electromechanical system. The components and/or architecture of the $n^{th}$ detector(s) 501 may be similar to those already described. Raw or processed data output from the fourth detector 302 may be optionally conditioned by a signal conditioner and/or processed by an analog-to-digital converter or other device before being received by the computer 80 and/or stored in the computer-readable medium 92. Non-limiting examples of the types of $n^{th}$ detector 501 include: a wheel diameter sensor; a wheel bearing assembly sensor configured to sense an approaching wheel bearing and to activate one or more microphones 22 of identical or staggered height; and a light sensor configured to detect sun shot or sky shot. These examples are illustrative only and not exhaustive.

Figure 6:
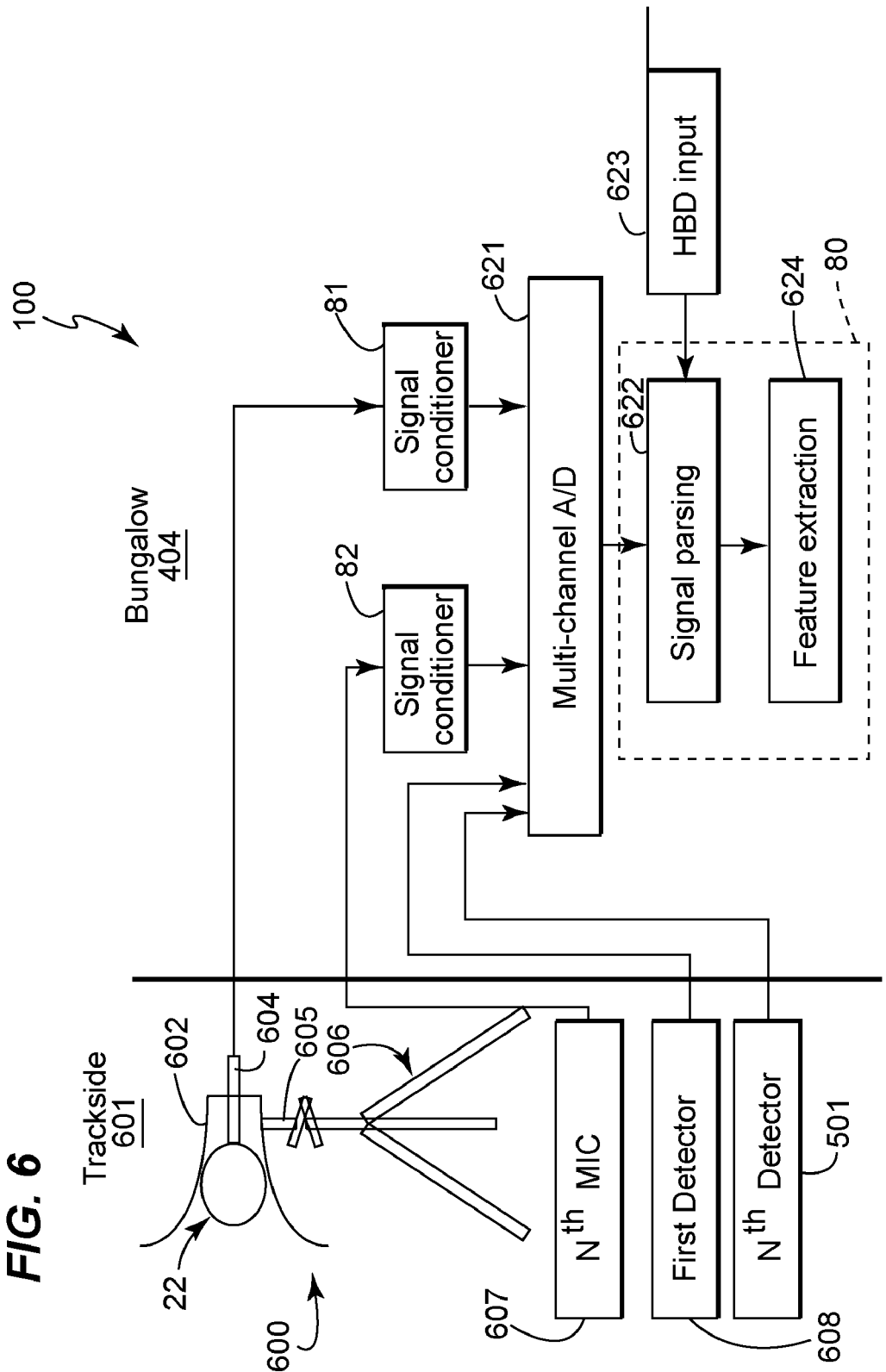
FIG. 6 is a diagram illustrating exemplary placement of one or more components of an embodiment of an inspection system.

The reader's attention is now briefly directed to FIG. 6, which is a schematic (not to scale) illustrating that some components of an inspection system 100 may be located trackside 601, while other components of the inspection system 100 may be located within a trackside bungalow 404. The trackside 601 portion of FIG. 6 includes a first microphone assembly 600 that includes an enclosure 602 configured to house the microphone 22, a microphone 22, a pre-amplifier 604, an adjustable base 605, and a tripod 606. The microphone assembly 600 may optionally include a wind shield that covers the microphone 22. Also (optionally) included on the trackside 601 is a $n^{th}$ microphone assembly 607, configured like the first, as well as a first detector 608 (which in one embodiment may be either a hot box detector or a hot wheel detector), and an $n^{th}$ detector 501.

The trackside bungalow 404 may include a signal conditioner 81 coupled with the microphone assembly 600; and a signal conditioner 82 coupled with the $n^{th}$ microphone assembly 607. The trackside bungalow 404 may further include a multi-channel analog-to-digital converter 621, which may be coupled with the signal conditioners 81, 82 and further coupled with the wheel detector 608 and the $n^{th}$ detector 501. A computer processor 80 (optionally) located within the trackside bungalow 404 may be coupled with the multi-channel analog-to-digital converter 621 and configured to receive and process data collected by the trackside components. Optionally, the computer 80 may be configured to receive data 623 input directly from a hot box detector. Additionally, the computer 80 may be equipped with software and/or hardware configured to first parse the digital signals 622 output from the analog-to-digital converter 621 and thereafter to perform predetermined feature extraction 624.

In operation, an inspection system 100 configured as shown in FIGS. 5 and 6 (and as described above) measures multiple operating characteristics about a mechanical or an electromechanical system (which, for ease of description and purposes of illustration only, is assumed to be a train). At least two of these multiple operating characteristics, such as sound and temperature, may be orthogonally related. For example, assuming a train passes the inspection system 100 from left to right, it will be scanned simultaneously and/or in sequence by one or more of the temperature detector 10, the acoustical detector 20, the hot wheel detector 72, the dragging equipment detector 302, and/or by an $n^{th}$ detector 501. The resulting data collected by each detector 10, 20, 72, 302, 501 may then be processed and/or fused by one or more computer processors 13, 21, 74, 304, 80 (using one or more known data fusion techniques) to determine whether one or more predetermined data thresholds (indicative of a defect or a dangerous operating characteristic) are met and/or exceeded. If so, an alarm may be generated and/or notice given to the remote and/or on-board train operator(s) so the train can be halted and/or inspected, and/or other corrective actions taken. An exemplary technical effect of the processing of the multiple types of orthogonally related data is that the false indication rate of one or more of the system's operating characteristics can be significantly reduced while the true detection rate of the same is maintained and/or improved.

An embodiment of the invention combines one or more of the data fusion techniques described above (and/or modifications thereof) with the use of two or more orthogonally-related detectors so that a false indication rate is reduced and/or eliminated. Referring back to FIG. 5, deployment of orthogonally related detectors 10, 20 reduces the false indication rate because the probability is minimal that both detectors 10, 20 will each trigger an alert when no defect or operating characteristic exists.

Figure 7:
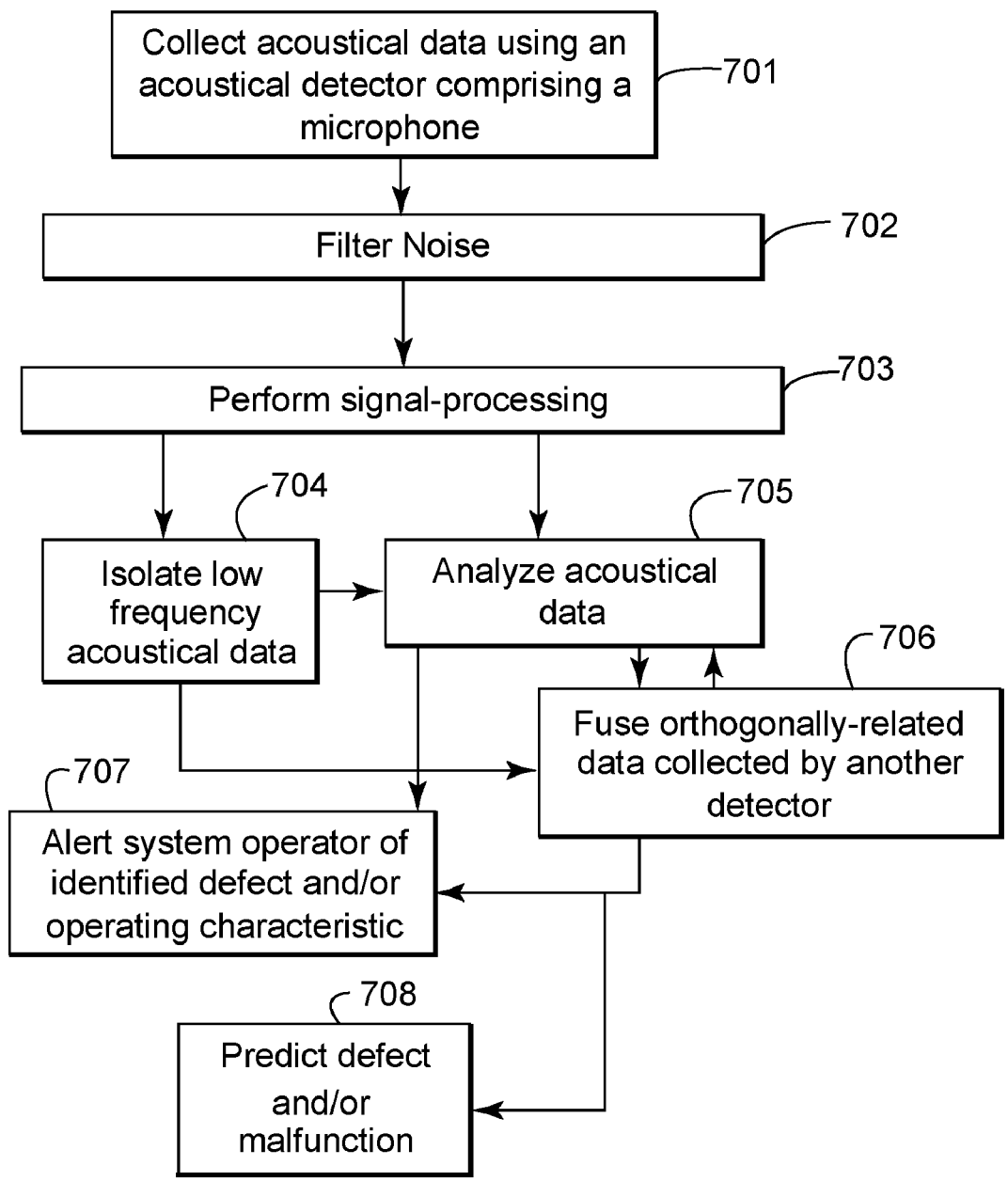
FIG. 7 is a flowchart of an embodiment of a method of collecting and processing acoustical signature data generated by one or more components of a mechanical or electro-mechanical system.

Reference is now made to FIG. 7, which is a flowchart illustrating steps of an embodiment of a method 700 for collecting, analyzing, processing, and/or fusing data collected by orthogonally-related detectors to reduce a false indication rate. Unless otherwise expressly indicated, one or more the steps 701, 702, 703, 704, 705, 706, 707 of the method 700 may be performed simultaneously, or in any suitable order using appropriately configured computer hardware and/or software.

The step 701 may include collecting data representative of an acoustical signature emitted by a mechanical or electromechanical system (or a component thereof) using an acoustical detector comprising a microphone. This data may take the form of one or more electrical signals output by the microphone.

The step 702 may include filtering noise from the one or more electrical signals output by the microphone. The step 703 may include performing signal processing on the one or more electrical signals. Examples of signal processing include, but are not limited to: amplifying, conditioning, recording, feature extracting, and analyzing. For example, the step 703 may further include conditioning the one or more electrical signals output by the microphone and/or analyzing them using an embodiment of an instant frequency analysis technique, which technique may advantageously reduce a number of microphones needed to detect defects in system components such as, but not limited to, railroad wheel bearing assemblies.

It has been discovered that embodiments of the instant frequency analysis technique described herein can enable a single microphone to accurately (and with minimal false indications) collect data indicative of an acoustical signature emitted by a mechanical or electromechanical system (or component thereof). A single microphone can be used because embodiments of the instant frequency analysis technique can accurately extract a desired frequency (or range of frequencies) from a signal having one cycle or less. An example of a desired frequency may be an acoustic frequency that uniquely corresponds to a particular type of system defect and/or to a particular type of system operating characteristic. An embodiment of the new instant frequency technique is described below with respect to FIG. 8. This discovery, however, does not preclude embodiments of the invention having multiple microphones configured to be used combination with an embodiment of the instant frequency analysis technique described herein.

Resuming the description of FIG. 7, the method 700 may further include a step 704. The step 704 may include isolating at least low frequency data from the one or more signals output by the microphone.

The step 705 may include analyzing the (low frequency, mid frequency, and/or high frequency) acoustical data to accurately identify a system defect and/or an undesirable system operating characteristic.

The step 706 may include fusing the results of the analyzing step 705 with other data collected from an orthogonally-related detector—a non-limiting example of which is a temperature detector.

At step 707, a computerized decision is made (based on the data fusion) whether to alert local/remote operators of the system being operated that a defect and/or an undesirable operating characteristic has/have been detected.

Figure 8:
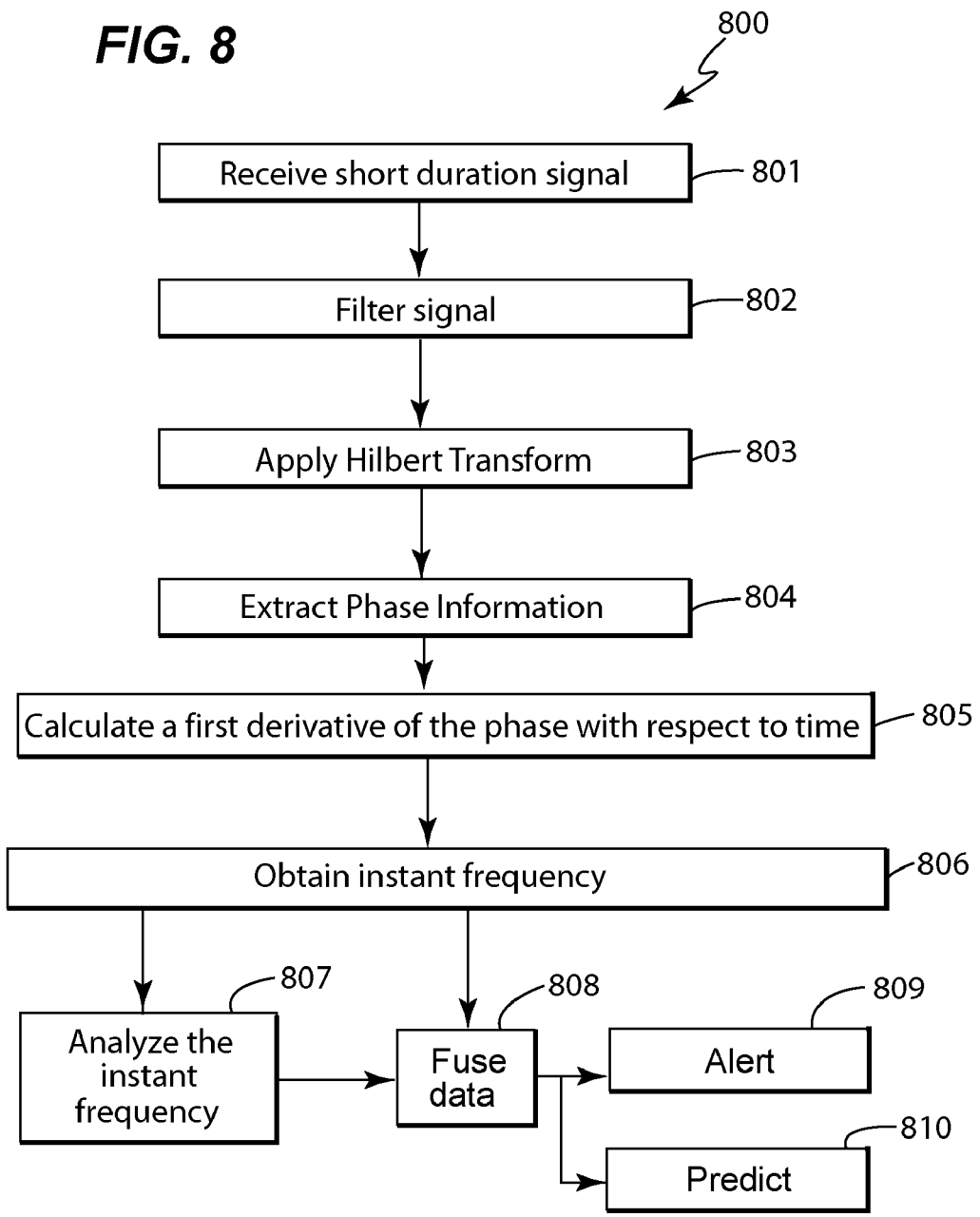
FIG. 8 is a flowchart of an embodiment of a method of processing one or more acoustical signals indicative of one or more defects and/or one or more operating characteristics of a mechanical or an electromechanical system.

FIG. 8 is a flowchart illustrating an embodiment of a method 800 for performing a new instant frequency analysis technique. Unless otherwise expressly indicated, one or more the steps 801, 802, 803, 804, 805, 806, 807, 808, 809 of the method 800 may be performed simultaneously, or in any suitable order using appropriately configured computer hardware and/or software.

The step 801 may include receiving a short duration (digital or analog) signal indicative of an operating characteristic of a mechanical or an electromechanical system being evaluated. The short duration signal may be derived from sound or vibration produced by the mechanical or electromechanical system.

The step 802 may include filtering the short duration signal. The filtering may be accomplished using one or more known signal-filtering techniques. In some embodiments, the short duration signal may also be amplified, conditioned, converted from analog-to-digital, and/or processed with known signal processing techniques.

The step 803 may include applying a known Hilbert transform to the short duration signal, which may include at least an acoustical signal or vibrational signal. In other embodiments, a known Hilbert transform may be applied to other types of signals. As one example, let x(t) be a real-valued signal. The Hilbert transform, x̄(t), is given as $$\bar{x}(t) = H[x(t)] = \frac{-1}{\pi} P \int_{-\infty}^{\infty} \frac{x(\tau)}{\tau - t} d\tau \quad (1)$$

$$x(t) = H^{-1}[\bar{x}(t)] = \frac{1}{\pi} P \int_{-\infty}^{\infty} \frac{\bar{x}(\tau)}{\tau - t} d\tau \quad (2)$$

These integrals are improper integrals in the sense of the Cauchy principal value denoted by P. Eq. (2) yields $$x(t) = \lim_{\varepsilon \to 0; A \to \infty} \frac{1}{\pi} \left\{ \int_{-A}^{t-\varepsilon} (\cdot) d\tau + \int_{t+\varepsilon}^{A} (\cdot) d\tau \right\} \quad (3)$$

The Hilbert transform described by Eqs. (1) and (2) are frequently written in terms of convolution notation $$\bar{x}(t) = \frac{1}{\pi t} * x(t) \quad (4)$$

$$x(t) = -\frac{1}{\pi t} * \bar{x}(t) \quad (5)$$

The functions x(t) and x̄(t) are called a pair of Hilbert transforms and denoted by $$x(t) \overset{H}{\Leftrightarrow} \bar{x}(t) \quad (6)$$

The complex signal whose imaginary part is the Hilbert transform of the real part is called the analytic signal, i.e. an analytic signal, X(t), is formulated as $$X(t) = x(t) + j\bar{x}(t) = A(t)e^{j\theta} \quad (7)$$

in which $$\begin{cases} A(t) = \sqrt{x^2(t) + \bar{x}^2(t)} \\ \theta(t) = tg^{-1}\left(\frac{\bar{x}(t)}{x(t)}\right) \end{cases} \quad (8)$$

The instantaneous frequency of the signal is defined as $$\omega(t) = 2\pi ft = \frac{d\theta(t)}{dt} \quad (9)$$

or $$\omega(t) = \frac{d}{dt}\left(tg^{-1}\frac{\bar{x}(t)}{x(t)}\right) = \frac{x(t)\dot{\bar{x}}(t) - \dot{x}(t)\bar{x}(t)}{x^2(t) + \bar{x}^2(t)} \quad (10)$$

The step 804 may include extracting phase information from the result of the Hilbert transform applied in step 803. The step 805 may include calculating a first derivative of the phase with respect to time.

The step 806 may include obtaining (using the first derivative calculated in step 805) an instant frequency. Thereafter, the method 800 may either proceed to step 807 or step 808.

The step 807 may include analyzing the instant frequency to determine what previously identified operating characteristic(s) (uniquely) correspond to the instant frequency. The analysis performed at step 807 may include, but is not limited to, comparing the instant frequency with a listing of stored frequencies that have been previously identified with corresponding unique defects and/or operating characteristics.

The step 808 may include fusing at least the instant frequency data (or a previously identified operating characteristic that corresponds at least to the instant frequency data) with other data collected by another orthogonally related detector. The fusing performed in step 808 may be accomplished using one or more of the types of data fusion referenced above.

At step 809, a decision is made (based on the data fusion) whether to alert local/remote operators of the system being operated that a defect and/or an undesirable operating characteristic has/have been detected.

Figure 9:
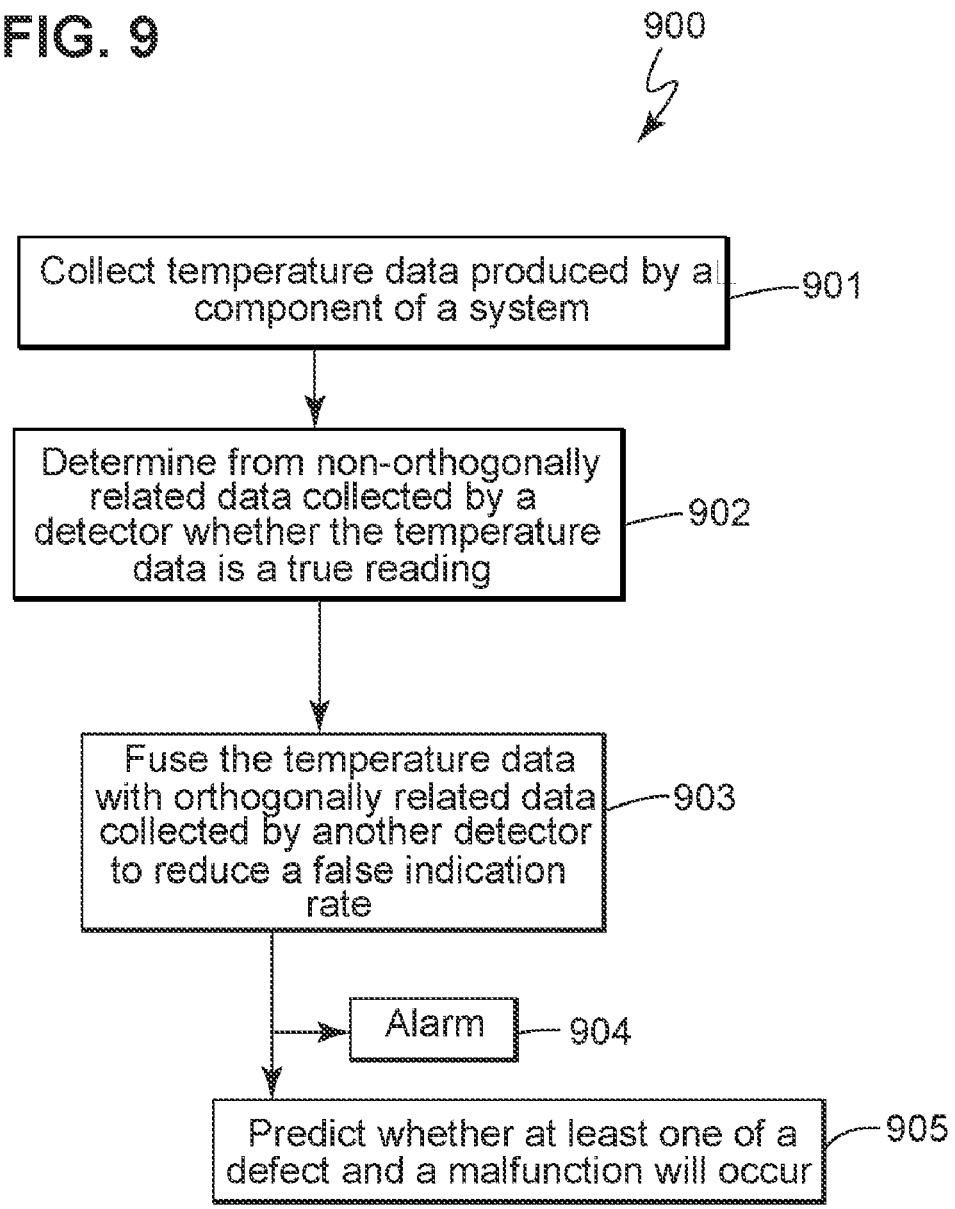
FIG. 9 is a flowchart of an embodiment of a method for predicting whether a defect and/or a malfunction will occur.

FIG. 9 is a flowchart of an embodiment of a method 900 for reducing a false indication rate and predicting whether a defect and/or a malfunction will occur. Unless otherwise noted, the steps of method 900 may be performed simultaneously or in any suitable order. At step 901, temperature data indicative of a true operating temperature of a system component may be collected using a temperature detector. In one embodiment, the system is a railcar, the component is a wheel bearing assembly or a wheel, and the temperature detector is a hot bearing detector or a hot wheel detector. At step 902, non-orthogonally related data from a detector may be used to determine whether the temperature data is a true reading. Microphonic data is an example of data that is non-orthogonally related to the temperature data. An accelerometer is an example of a detector that is non-orthogonally related to the temperature detector. At step 903, the method 900 may include reducing a false indication rate by fusing the temperature data with orthogonally related data collected by a detector. Acoustical data is an example of data that is orthogonally related to the temperature data. An acoustical detector having a microphone is an example of a detector that is orthogonally related to the temperature detector. At step 904, if a defect and/or an operating characteristic is identified, an alarm may be activated and/or notification provided to an operator of the system. At step 905, a prediction may be made as to whether a defect and/or an operating characteristic will occur in the future.

FIG. 10 is a flowchart of a method 1000 that is another embodiment of the method of FIG. 9. The steps 1001, 1002, 1003, 1004, 1005, 1006, and 1007 may be performed simultaneously or in any suitable order. At step 1001, a temperature detector may collect temperature data produced by a component of a railroad system or other system. At step 1002, microphonic data may be detected that may adversely affect the collected temperature data. At step 1003, a false indication in the temperature data may be eliminated based on the detected microphonic data. At step 1004, acoustical data may be collected. At step 1005, at least one of a defect and an operating characteristic of the component may be identified based on the collected acoustical data. At step 1006, if a defect and/or an operating characteristic is identified, an alarm may be activated and/or an operator of the system notified. At step 1007, a prediction may be made as to whether a particular type of defect and/or malfunction will occur.

Embodiments of the invention may include one or more of the following non-limiting examples of orthogonally-related detectors: acoustical detectors, and temperature detectors.

Orthogonally-related sensors may include microphones and temperature sensors. Exemplary types of temperature sensors may include infrared, photovoltaic, piezoelectric, pyroelectric, and thermopile sensors. Exemplary types of non-orthogonally related sensors may include: accelerometers and output signal integrity sensors. Each of these exemplary types of orthogonally-related and non orthogonally-related sensors is briefly described below.

Accelerometers are mechanical or electromechanical devices that measure acceleration, usually by acceleration forces on the sensor mass load. These forces may be static, like the constant force of gravity, or dynamic, such as forces caused by moving or vibrating the accelerometer transitionally and/or angularly. Using the dynamic measurements from the accelerometer, a microprocessor or digital signal processing algorithms can be used to filter the microphonic noise component from temperature detector data. The acceleration of the temperature detector is measured by the accelerometer and the effect on the outputted temperature signal is computed from the known microphonic transfer function of the temperature detector. The computed microphonic noise may then be subtracted from the data output by the temperature detector. Alternately, rather than removing the microphonic noise, this temperature signal can be ignored when microphonic events are detected by the accelerometer. Implementation of these embodiments is not necessarily limited to computer software but could alternately be implemented in any standalone hardware.

An acoustic detector may include a microphone (defined below) configured to detect a unique acoustical signature emitted from a mechanical or an electromechanical system being evaluated. The unique acoustical signature may correspond to an operating characteristic of a component of the mechanical or electromechanical system using one or more signal processing techniques. An acoustic detector may be used independently of other detectors to determine a defect or an operating characteristic of a system. However, when combined with a hot bearing detector, an advantage of employing an acoustic detector is that its microphone(s) is/are immune to sun shot, sky shot, and microphonics at the hot bearing detector location. The terms "microphonics" and "sun shot" were defined above. The term "sky shot" references a false temperature reading that may occur when a temperature sensor falsely outputs a temperature different than the true operating temperature of a system component. The false indication of temperature typically results from the difference between the temperature of the outside environment and the temperature of the component being measured. In a railroad application, sky shot can occur when a wayside temperature sensor mistakenly reads the sky's low temperature and then generates a false indication of overheating after sensing a higher (but normal) temperature of a passing railway car wheel bearing.

An output signal integrity sensor can be a current or voltage sensor combined with software configured to detect whether the hot box detector is properly connected to one or more other components of an inspection system.

At the present writing, two types of infrared sensors exist. A first type, called an infrared non-imaging sensor, collects infrared radiation only at single point. The second type, called an infrared imaging sensor, collects infrared radiation at multiple points, which can form an array, and can provide data that can be used to create one or more thermal images.

A microphone is a device that converts acoustic sound waves into electrical signals that represent the sound waves. The electrical signals output by a microphone can be amplified, conditioned, mixed, recorded, processed, and/or analyzed. To improve accuracy of detection, an embodiment of the invention provides an acoustic detector in combination with other types of orthogonally-related detectors.

Photovoltaic sensors are devices based on crystalline or amorphous compounds that convert photons into photoelectrons or photocurrent, which forms a signal proportional to intensity over a range of wavelengths. Photovoltaic sensors may be applied to temperature measurements.

Piezoelectric sensors contain asymmetric crystals that when strained along an axis will generate an electric field across their faces. If these faces are plated with metal, the electric field appears as a voltage. When the asymmetric crystals are heated, the temperature difference between their faces creates a strain coupled through a thermal expansion coefficient to produce a polarization and consequent charge separation and voltage. Piezoelectric sensors are also pyroelectric and vice versa.

Pyroelectric sensors generate an electrical current on the surface of a material that is proportional to the rate at which the temperature of the material changes.

A sunlight sensor can be used in an embodiment of the invention to detect sun shot and to screen its effects from data collected and/or outputted by the temperature detector. Illustratively, if sun shot is detected to be primarily on one or more edges of a temperature detector data profile, it will have limited overlap with data indicative of bearing temperature, and can be screened without reducing the true detection rate. If considerable overlap between the sun shot and data indicative of bearing temperature exists, then two or more infrared sensors—each facing in a direction different than the other—could be activated. Thereafter, data from the sunlight sensor can be used to ignore data collected by one or more of the two or more infrared sensors.

Thermopiles are comprised of multiple thermocouples—junctions of dissimilar metal—that generate voltage as a function of temperature.

Embodiments of the invention provide one or more technical effects. For example, one technical effect is that computer code executed by a computer processor can cause at least temperature data and acoustical data monitored by orthogonally-related detectors to be fused and/or processed to determine whether a system (or one or more components thereof) is malfunctioning or operating properly. Another technical effect is that this determination can be made with minimal or no false indications, which lowers the cost of operating the device(s) (i.e., locomotives, railroad rolling stock, turbines, manufacturing or machining equipment, etc.) being monitored. Yet another technical effect is accurate pre-detection of a defect or operating characteristic to forecast and/or prevent accidents and/or damage to the system being monitored (or to one or more of its components).

The embodiments of a system and method for determining a defect and/or an operating characteristic of a railroad system or other system, shown and described herein are illustrative only. Those skilled in the art who review this disclosure will readily appreciate that substitutions, modifications, changes and omissions may be made in the architecture, components, data processing, and arrangement of the preferred and other exemplary embodiments without departing from the spirit of the invention as expressed in the appended claims. Accordingly, the scope of the appended claims is intended to include all such substitutions, modifications, changes, and omissions.

What is claimed is:

1. A method, comprising:
    collecting acoustical data produced by a system passing in proximity to an acoustic detector having a microphone;
    analyzing the acoustical data to identify an operating characteristic of the system;

performing signal-processing on the acoustical data, wherein the signal-processing at least includes an instant frequency analysis method; and fusing the acoustical data with orthogonally-related data produced by the system passing in proximity to an orthogonally-related detector to improve the accuracy of operating characteristic identification.

2. The method of claim 1, further comprising:

alerting an operator of the system of an identified defect and/or an identified operating characteristic of the system.

3. The method of claim 1, wherein the instant frequency analysis method comprises:

receiving a short duration signal produced by the system;
filtering the short duration signal;
applying a Hilbert transform to the short duration signal;
extracting phase information from the result of the Hilbert transform step;
calculating a first derivative of the phase with respect to time and obtaining an instant frequency.

4. The method of claim 1, wherein the step of analyzing the acoustical data further comprises:

analyzing the instant frequency to identify a defect of the system and to identify the operating characteristic of the system; and wherein the step of fusing the acoustical data further comprises:

fusing the instant frequency with the orthogonally-related data collected by at least the orthogonally-related detector to reduce the false indication rate.

5. The method of claim 1, wherein the system is selected from the group consisting of a piece of railroad rolling stock, a turbine, manufacturing equipment, and machining equipment.

6. The method of claim 1, wherein the orthogonally-related detector is a temperature detector.

7. The method of claim 1, further comprising:

predicting whether at least one of a defect and a malfunction will occur.

8. The method of claim 1, wherein the operating characteristic of the system includes defects in the system.

\* \* \* \* \*